United States Patent [19]

Kretschmer et al.

[11] 4,170,022
[45] Oct. 2, 1979

[54] APPARATUS AND PROCESS FOR RECORDING WITH VARIABLE CORRECTION OF A TELEVISION SIGNAL HAVING THREE COMPONENTS

[75] Inventors: Sylvain Kretschmer; Jean-Pierre Lacotte; Pierre Oprandi, all of Paris, France

[73] Assignee: Thomson-Brandt, Paris, France

[21] Appl. No.: 876,566

[22] Filed: Feb. 10, 1978

[30] Foreign Application Priority Data

Feb. 15, 1977 [FR] France ............................... 77 04192

[51] Int. Cl.² .......................... H04N 5/76; G11B 7/00
[52] U.S. Cl. .................................. 358/4; 179/100.4 C
[58] Field of Search ........................... 358/4, 6, 8; 179/100.4 C, 100.3 V

[56] References Cited

U.S. PATENT DOCUMENTS

| 3,944,754 | 3/1976 | Ishigaki | 179/100.4 C |
| 4,008,381 | 2/1977 | Takahashi et al. | 179/100.4 C |

FOREIGN PATENT DOCUMENTS

| 847455 | 2/1977 | Belgium . |
| 2261587 | 9/1975 | France . |

Primary Examiner—Bernard Konick
Assistant Examiner—Donald McElheny, Jr.
Attorney, Agent, or Firm—Cushman, Darby & Cushman

[57] ABSTRACT

A process for recording on a video-disc a television signal comprising a luminance signal, a chrominance signal, and a sound signal, wherein these three signals modulate respectively three carrier-waves. The three modulated carrier-waves are added and then optically recorded onto said video-disc along a spiral track. The level of these three modulated carrier-waves are each processed according to their own correction parameters related to the distance of the recording point from the center of the video-disc, thus allowing the disc to be later read without any correction processing during reading out.

6 Claims, 5 Drawing Figures

APPARATUS AND PROCESS FOR RECORDING WITH VARIABLE CORRECTION OF A TELEVISION SIGNAL HAVING THREE COMPONENTS

BACKGROUND OF THE INVENTION

This invention relates to processes for recording a signal on a disc and, more particularly, to processes for recording on a disc a wide-band signal which may be subsequently be read by optical reading techniques. This technique is known as the video-disc technique and is especially useful for the recording of television programmes.

The invention also relates to the apparatus used for carrying out these recording processes and to the discs obtained by these processes.

In general, television signals to be recorded do not correspond to a single base signal, but more often to several separate signals which have to be multiplexed. Thus, an ordinary television signal generally contains three separate signals, namely a luminance signal, a chrominance signal and a signal representing the sound.

These signals cannot be multiplexed simply by mixing, and thus various encoding processes have been proposed.

One of these processes is described in U.S. Pat. No. 4,068,259. In one embodiment of this process, three carriers S1, S2 and S3 are respectively frequency-modulated respectively by the three luminance, chrominance and sound signals. Since the band widths of these signals are very different, different amplitudes have had to be adopted for these carriers, in order to distribute the energy equally among them and to minimize intermodulation. The three carriers thus modulated are added and then amplitude-limited. The spectrum of the resulting composite signal comprises a large number of spectral lines, the amplitudes of the three main spectral lines corresponding to the three unmodulated carriers being related to the initial amplitudes of those three carriers.

The composite signal thus obtained is recorded on a disc in the form of marks of variable length and spacing distributed along a spiral track.

The disc thus obtained, or its copies, may then be read at will in a reader which includes an optical reading head which illuminates the recorded track with a light beam and which translates the recorded variations in spatial distribution introduced into the beam by the track into variations of an electrical reading signal.

Like any physical device, a reading head such a this has a limited and non-linear transfer function. FIG. 1 shows the output level A expressed as dB of the reading signal in a function of the spatial half-period $l$ expressed in $\mu m$, this spatial half-period $l$ being defined as the length of a mark for a constant form factor and equal to $\frac{1}{2}$, i.e., when the mark are separated by a distance equal to their length. This curve applies to a reading head provided with a lens having a relative aperture (the most important parameter) of 0.40.

Since the disc is rotated at a constant speed both during recording and during reading, the spatial frequencies corresponding to the three spectral lines increase regularly as the track moves nearer its centre, the reading radius becoming increasingly shorter. Co-relatively, the absolute and relative amplitudes of these lines in the reading signal change in accordance with this curve. The relative levels which had been defined during recording so as to limit the intermodulation, while at the same time maintaining and adequate signal-to-noise ratio, are no longer observed, resulting in degradation of the reconstituted image after processing of the reading signal.

SUMMARY OF THE INVENTION

In accordance with the present invention, there is provided a process for optically recording on a video-disc a television signal comprising a luminance signal, a chrominance signal, and a sound signal, which process comprises the steps of:

moving a recording head along a radius of said video-disc towards the centre of the video-disc; said video-disc being rotating around said centre;

modulating three carrier-waves with respectively said luminance signal, chrominance signal, and sound signal;

modifying the level of the three modulated carrier-waves according to respectively three different given laws with respect to the distance of said recording head from said centre;

summing said three modulated carrier-waves for delivering a recording signal; and controlling with said recording signal means for optically modifying the surface of said video-disc along a spiral track defined by the relative motion of said recording head and of said video-disc.

BRIEF DESCRIPTION OF THE DRAWINGS

For a better understanding of the invention, and to show how the same may be carried into effect, reference will be made to the ensuing description and to the attached figures among which.

Figure 2:
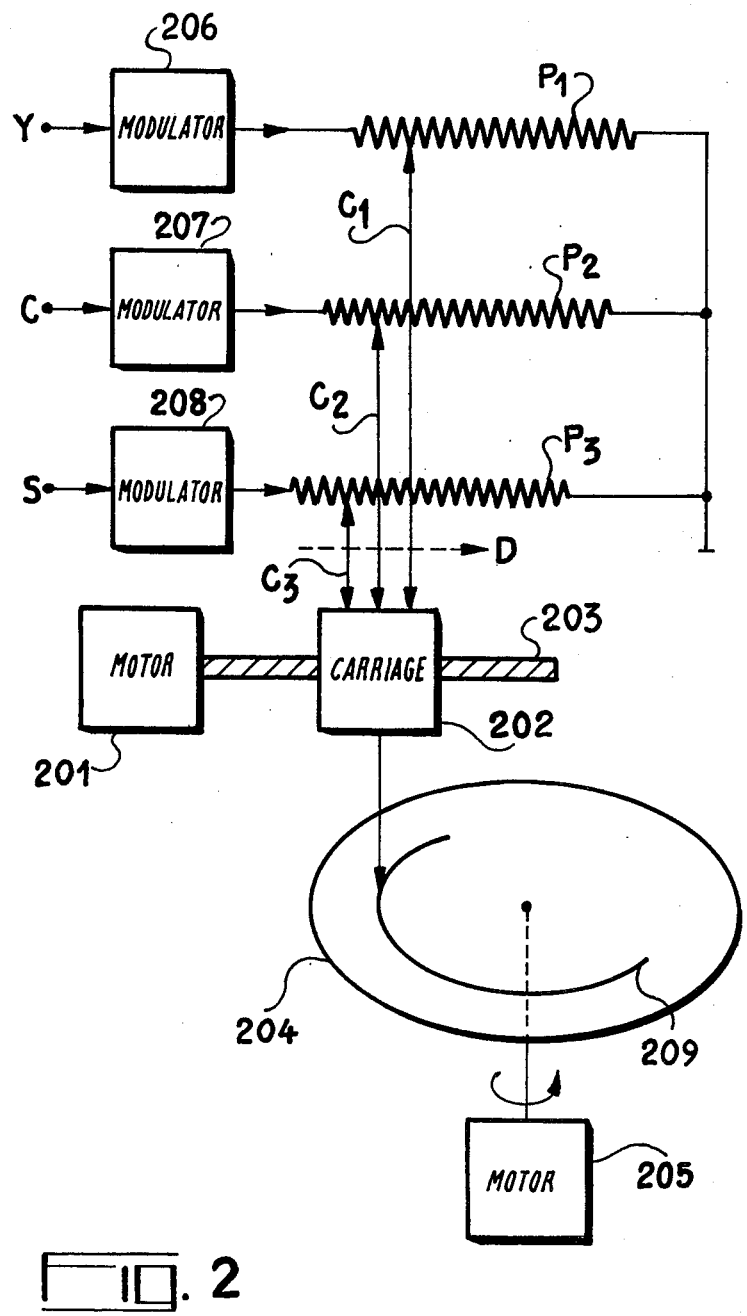
FIG. 2 schematically illustrates the video-disc recorder according to the present invention.

The video-disc recorder shown schematically in FIG. 2, which is restricted to the elements required for understanding the invention, comprises two motors 201 and 205, a lead screw 203, a carriage 202, three modulators 206 to 208 and three potentiometers P1 to P3.

The luminance, chrominance and sound signals Y, C and S, respectively, coming from an external apparatus (for example an electronic camera) modulate three carriers S1 to S3, respectively, in the usual way in the modulators 206 to 208.

The output signals of these modulators are respectively applied to the three potentiometers P1 to P3. Fractions of these signals appear on the slides of these potentiometers and are transmitted by the connections C1 to C3 to an adder contained in the carriage 202.

The carriage 202 is driven by translation along a diameter of the disc 209 to be recorded by the lead screw 203 which is itself rotated by the motor 201. This carriage also contains a recording head which emits a luminous recording beam under the control of the sum signal obtained in the manner described above. This light beam records a track, of which only the part 209 is shown, on the disc 204 rotated by the motor 205. This track is a spiral due to the combined movements of the carriage 202 and the disc 204.

The carriage 202 also drives the slides of the potentiometers in the direction D. In the described embodiment, these potentiometers are straight and the slides are simply fixed to the carriage, although it would also be possible to use rotary potentiometers and a different mechanical link, for example a cable and pulley gears.

The potentiometers P1 to P3 are of the functional type, i.e. the resistance along the track represents a desired function which may not be linear. Potentiometers such as these are commonly used in servomechanisms and may be obtained for example by serigraphy of a track of variable width.

The functions represented by the potentiometers are selected to compensate the variations in level during reading of the disc.

Figure 1:
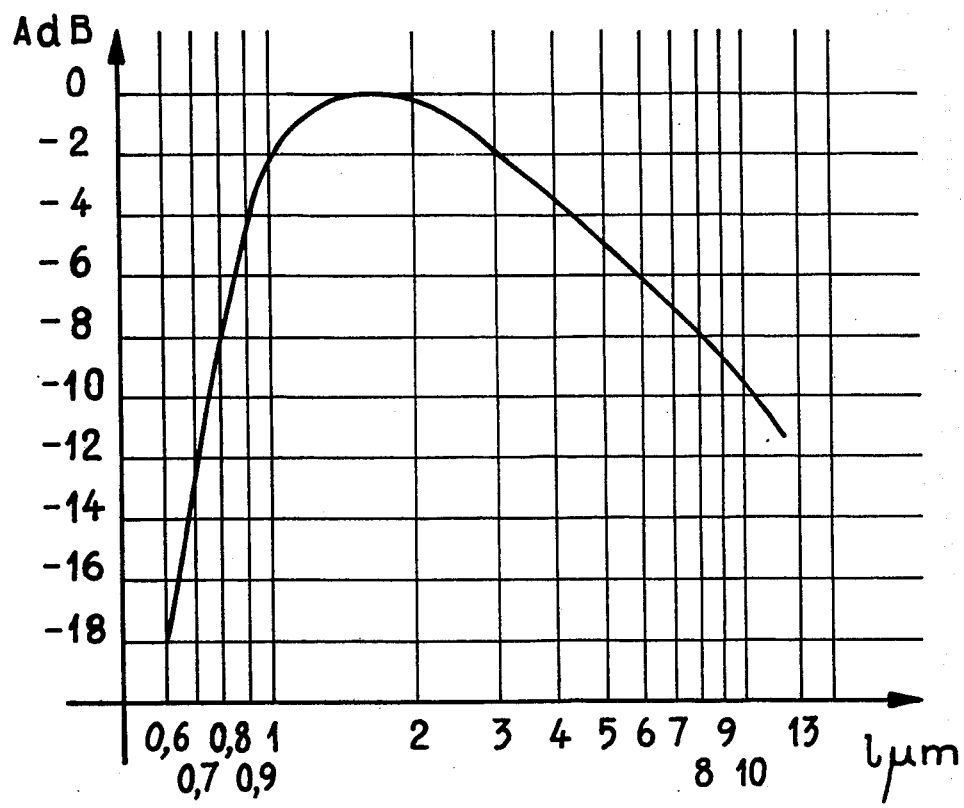
FIG. 1 graphically depicts a response curve of a video-disc recorder reading head.
Figure 3:
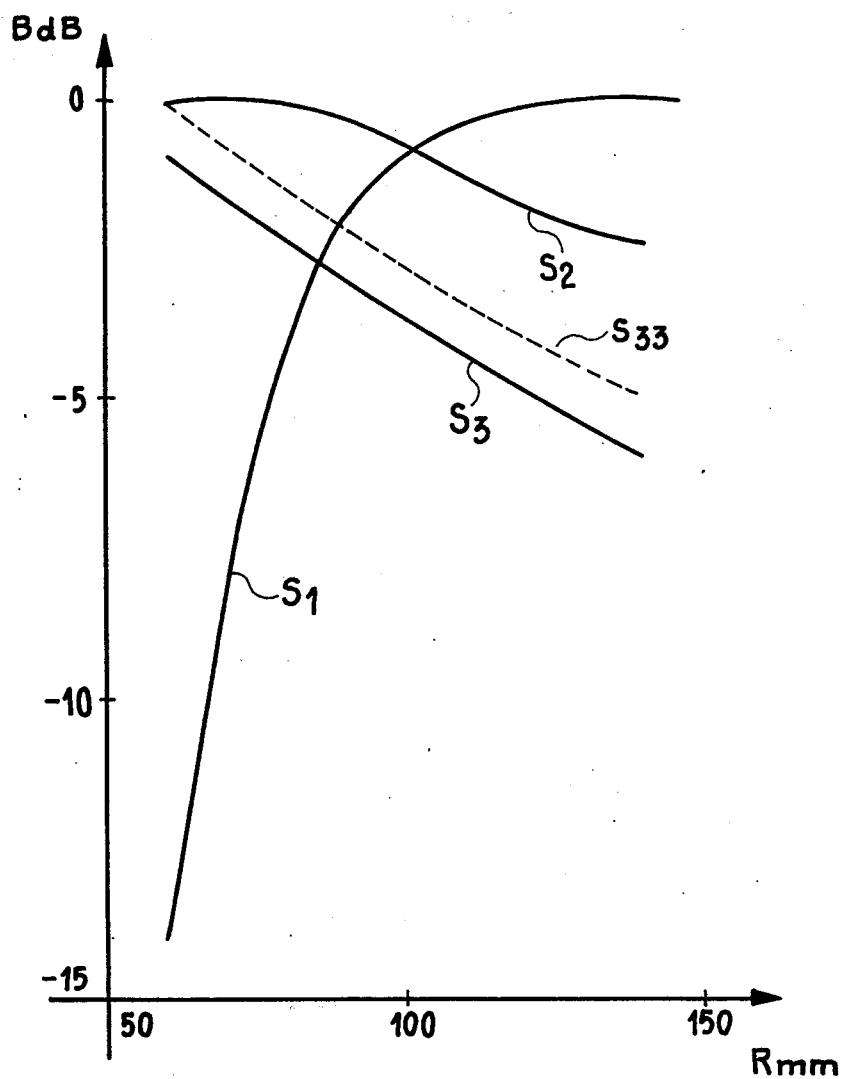
FIG. 3 graphically depicts the play-back level curves of a set of subcarriers.

In order to obtain the functions representing these variations in level, the spatial half period $l$ may be calculated from the reading radius R, the rotational speed n of the disc and the frequency F of the carrier. Thus, $l=(\pi Rn/F)$. Transfer of these values to the graph of FIG. 1 gives the attenuations in as a function of the radius. Thus, the curves of FIG. 3 representing the attenuations B in dB relative to a level 0 dB corresponding to the maximum of the curve of FIG. 1 and as as a function of the reading radius R in mm were obtained for a set of carriers S1, S2, S3 with frequencies of, respectively, 7.1 MHz, 3.3 MHz. and 1.9 MHz. These curves are normalized relative to 0 dB for S1 and S2 because the maxima of FIG. 1 is passed during reading. It is interesting to use the normalized curve of S3 by shifting it upwards by 1 dB, which results in curve S33. This is because it is advantageous to use the entire scale provided by a potentiometer because the potentiometer introduces noise and it is desireable that the minimal attenuation factor be fixed in relation to the variable part. Accordingly, the necessary relative levels, i.e., for example 1 for S1, 0.2 for S2 and 0.15 for S3, will be obtained by adopting suitable carrier levels in the modulators 206 to 208.

Under these conditions, the functions represented by the potentiometers P1 to P3 will be complementary to those represented by the curves S1, S2 and S3 of FIG. 3.

Figure 4:
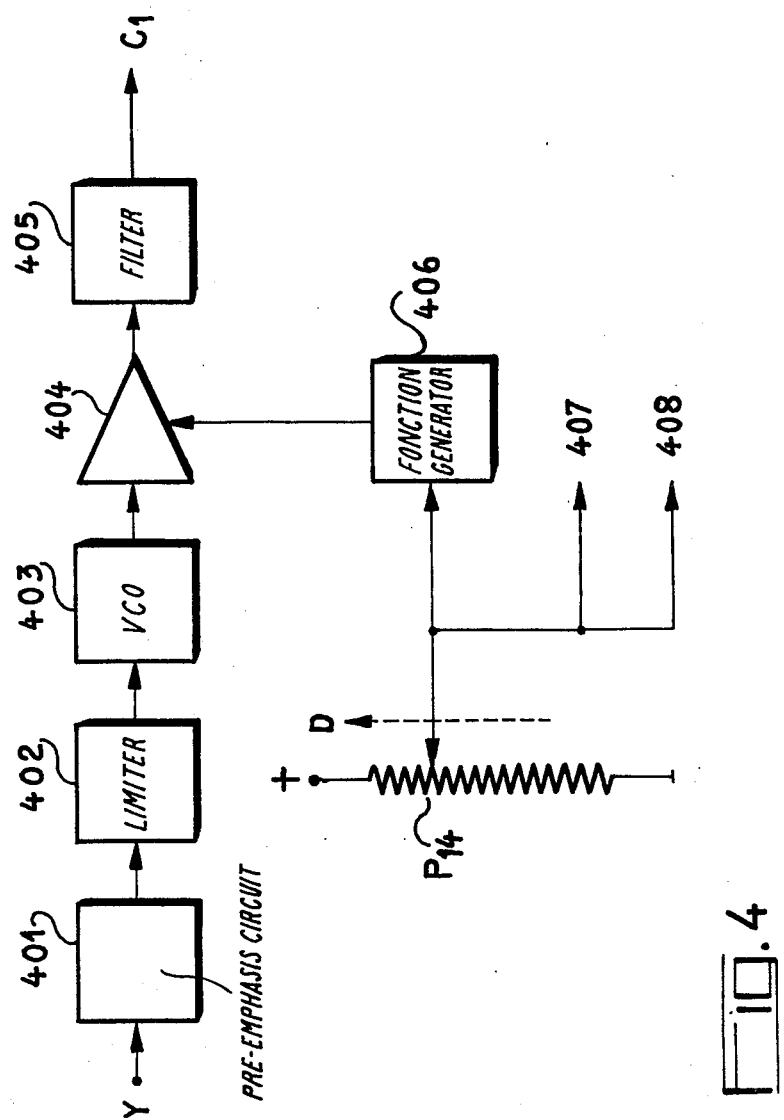
FIG. 4 schematically represents a modulation channel of a disc recorder.

In another embodiment, the need to use three separate potentiometers and to introduce high frequency signals into these potentiometers is eliminated by using a single potentiometer controlling a variable-gain amplifier. This embodiment is illustrated FIG. 4 in which is directed to the channel Y and modulated 206.

The luminance signal Y is applied to a pre-emphasis circuit 401. This circuit, which is standard in frequency modulation, is of the RC type for example and counteracts the noise which increases with the modulating frequency when such modulation is employed.

The emphasized signal is limited by the limiter 402 which eliminates the modulation peaks capable of producing excessive width in the spectrum of the modulated carrier.

The signal thus limited is applied to a voltage-controlled oscillator 403, for example of the VCO-type, which delivers a carrier the frequency of which is dependent substantially linearly upon the voltage applied by the circuit 402. A carrier frequency-modulated by the luminance signal is thus obtained.

The level of this modulated carrier is variably attenuated by an attenuator 404, for example a field effect transistor operating as a variable resistance, after which the carrier thus attenuated is applied to a filter 405 which limits its spectrum before it passes through the connection C to the adder contained in the carriage 202.

The slide of the potentiometer P 14, fed with a fixed voltage, is mechanically connected to the carriage 202. This slide travels in direction D and is connected to the function generator 406. In the described embodiment, the potentiometer is linear and the voltage of its slide is therefore a linear function of the recording radius. The function generator 406, e.g. of the diode type, enables a control voltage, which varies as a function of the recording radius according to the desired correction relationship, to be delivered to the attenuator 404 from this linearly varying voltage.

The slide of potentiometer P 14 is also connected by the connections 407 and 408 to the function generators, contained in the channels C and S which are not shown in this drawing.

Figure 5:
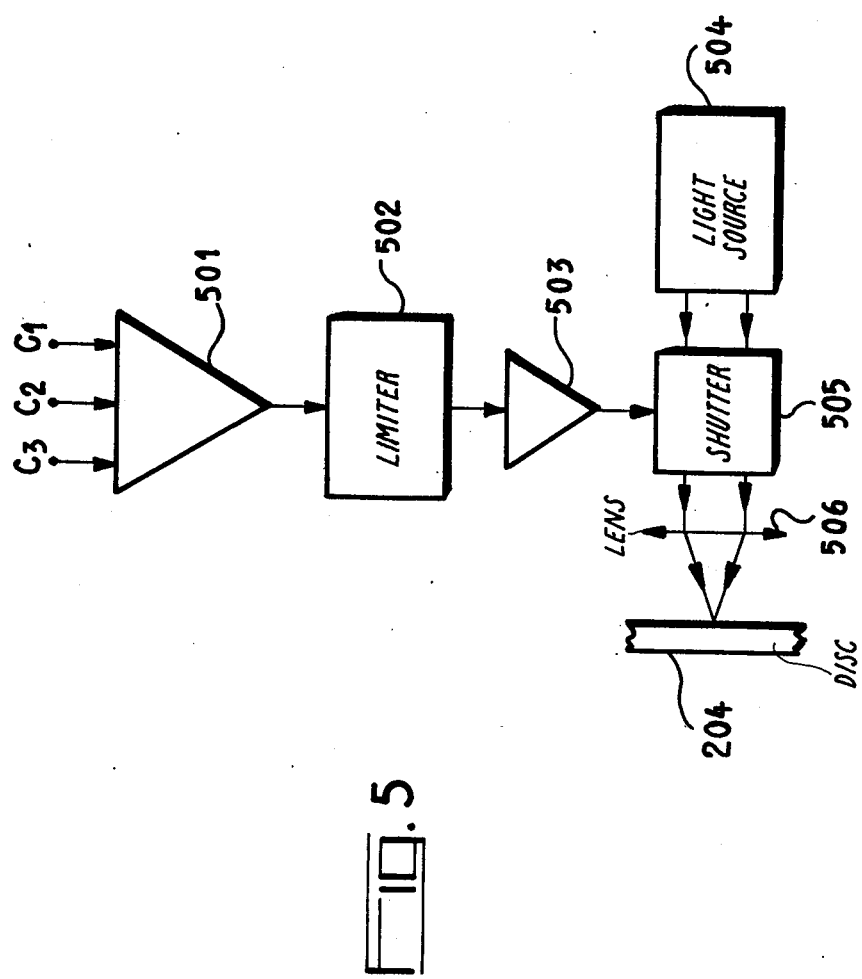
FIG. 5 schematically represents a recording head.

FIG. 5 illustrates a view of the elements accommodated in the carriage 202.

The modulated and filtered sub-carriers arrive through connections C1 to C3 at the inputs of a summing amplifier 501.

The composite signal resulting from this summation is limited in a peak limiter 502 which delivers a substantially rectangular signal with steep sides. It is the position of these sides which represents the information contained in the composite signal and it is imortant that this position be well defined, i.e., that these sides will be steep.

This rectangular signal is amplified in a power amplifier 503 which controls an electrooptical shutter 505. This shutter provides for the go-no go modulation of a light beam emitted by the light source 504, for example a laser. The beam thus modulated is focussed onto surface of the disc 204 by means of an optical system 506.

The disc thus recorded and its copies can then to be read in a reader containing no means for correcting the amplitude of the sub-carriers, and the reading level of the various sub-carriers will at their optimal levels.

The invention extends to any encoding system comprising any number of carriers.

What we claim is:

1. A process for optically recording on a video-disc a television signal comprising a luminance signal, a chrominance signal, and a sound signal, which process comprises the steps of:
   moving a recording head along a radius of said video-disc towards the centre of the video-disc; said video-disc being rotating around said centre;
   modulating three carrier-waves with respectively said luminance signal, chrominance signal, and sound signal;
   modifying the level of the three modulated carrier-waves according to respectively three different given laws with respect to the distance of said recording head from said centre;
   summing said three modulated carrier-waves for delivering a recording signal; and
   controlling said recording head with said summed modulated carrier waves to optically modify the surface of said video-disc along a spiral track defined by the relative motion of said recording head and of said video-disc.

2. A process as claimed in claim 1, wherein the modulation is a frequency modulation, and the modification of the surface includes the writing in of a series of marks having variable length and spacing.

3. An apparatus for optically recording on a video-disc a television signal comprising a luminance signal, a chrominance signal, and a sound signal, which apparatus comprises:
  means for rotating said video-disc around its centre;
  means for moving a recording head along a radius of said video-disc towards said centre;
  means for modulating the three carrier-waves with respectively said luminance signal, chrominance signal, and sound signal;
  means for modifying the level of the three modulated carrier-waves according to respectively three different given laws with respect to the distance between said recording head ans said centre;
  means for adding the three level-modified modulated carrier-waves, and delivering a recording signal to said recording head.

4. An apparatus as claimed in claim 3, wherein said modifying means comprise three potentiometers receiving respectively said three modulated carrier-waves, and delivering onto respectively three slides said level-modified modulated carrier waves; said three slides being mechanicaly connected to said recording head for moving in accordance with the motion of the recording head.

5. An apparatus as claimed in claim 3, wherein said modifying means comprise three potentiometers connected to a fixed voltage source for delivering onto respectively three slides respectively three variable voltages; said three slides being mechanicaly connected to said recording head for mvoing in accordance with the motion of the recording head; said three variables voltages being applied to respectively three variable-gain amplifiers for controlling the amplification of said amplifiers; and said amplifiers receiving respectively said three modulated carrier-waves and delivering respectively said level-modified modulated carrier-waves.

6. An apparatus as claimed in claim 3, wherein said modifying means comprise a potentiometer connected to a fixed voltage source for delivering a linearly variable voltage onto a slide mechanicaly connected to said recording head for moving in accordance with the motion of the recording head; said linearly variable voltage being applied to simultaneously three function generators for delivering respectively three function-variable voltages; said three function-variable voltages being applied to respectively three variable gain amplifiers for controlling the amplification of said amplifiers; and said amplifiers receiving respectively said three modulated carrier waves and delivering respectively said level-modified modulated carrier-waves.

* * * * *